Nov. 13, 1945.   H. M. SCARFF   2,388,871

PISTON RING CLAMPING DEVICE

Filed Dec. 20, 1943

Inventor
Harold M. Scarff
By Liverance and
Van Antwerp
Attorneys

Patented Nov. 13, 1945

2,388,871

UNITED STATES PATENT OFFICE 2,388,871

PISTON RING CLAMPING DEVICE

Harold M. Scarff, Muskegon, Mich., assignor to Muskegon Piston Ring Company, Muskegon, Mich., a corporation of Michigan Application December 20, 1943, Serial No. 515,068

3 Claims. (Cl. 29—269)

This invention relates to a piston ring loading device, the primary object and purpose of which is to contract a plurality of piston rings at an intermediate stage of their finishing operations to a predetermined outside diameter and clamp them against each other between two opposed clamping surfaces, one against the outside of each of the outermost rings of a plurality of rings which are thus clamped, thereby securing them in such closed and clamped relation on an arbor which is taken to a lathe, grinding machine or other machine and mounted therein for machining the outer curved surfaces of the rings or performing any other operation thereon which may be desirable. Such finishing operations may be either the rough turning or the final finished turning.

With the present invention the loading of arbors is expedited, and there is no need for exerting a heavy force by the operator of the machine in order to secure the proper clamping of the rings in their contracted positions, making the device readily available for operation by women where, previously with the clamping done by screwing a heavy clamping nut upon the arbor, with a necessity of exerting considerable strength in clamping the nut, the field of employees was limited to those having a very considerable strength, precluding the use of women or boys for such purpose who are unable to stand the exertion required for the several hours of a working day.

An understanding of the invention may be had from the following description taken in connection with the accompanying drawing, in which Fig. 1 is a vertical section through the ring loading clamping device of my invention.

Like reference characters refer to like parts in the different figures of the drawing.

Figure 1:
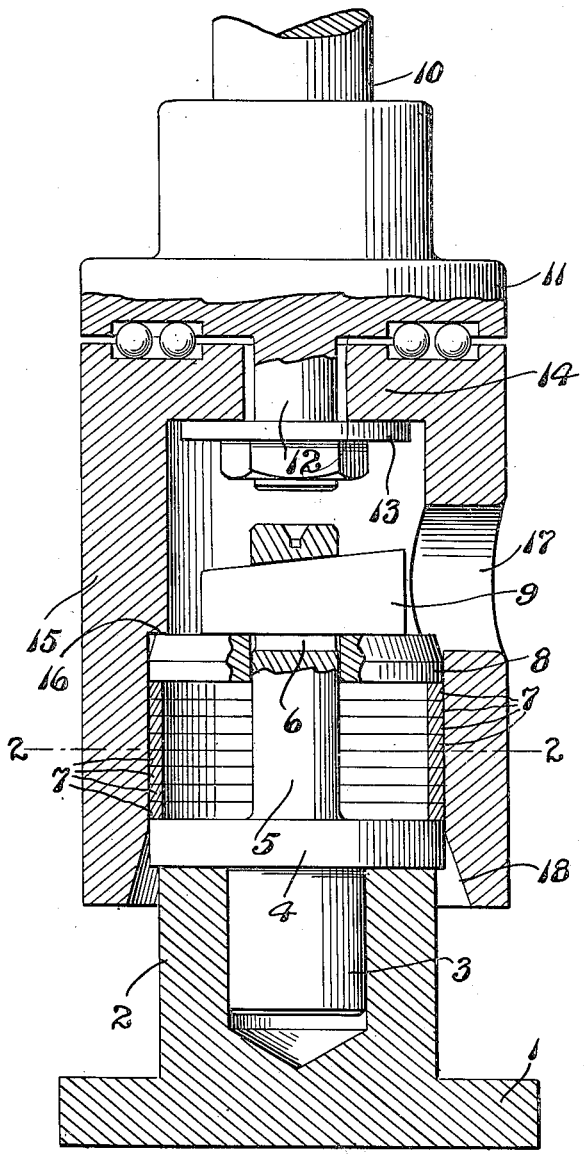
Figure 4:
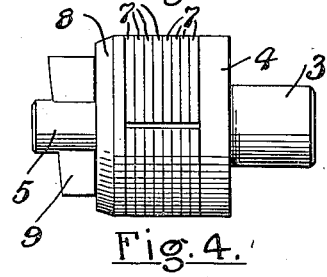
Fig. 4 shows an arbor loaded with rings ready for the subsequent operations thereon.

In the preferred construction embodying the invention a fixture is provided having a base 1 from which a central heavy post 2 extends vertically having a central cylindrical opening from its upper end downwardly for a distance therein. Such fixture may be secured to the table of an arbor press and is adapted to receive one end of an arbor upon which the rings are to be loaded.

The arbor has an end section 3 of a size that it closely fits the opening in the post 2 but readily enters such opening. At the inner end of the section 3 an annular flange or collar 4 is integrally formed and centrally extending from said flange is a section 5 of less diameter than the section 3 but co-axial therewith. The section 5 adjacent its outer end has a diametrically disposed slot 6 therethrough, the outer boundary or edge of which is disposed at an angle to the axis of the arbor, as shown.

Figure 3:
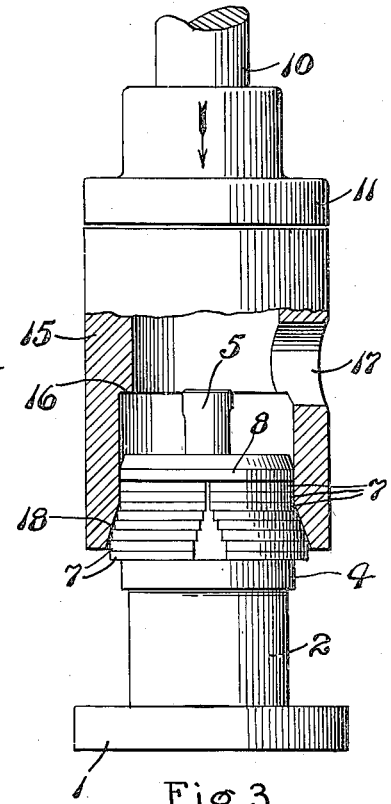
Fig. 3 is a view similar to Fig. 1 at a reduced scale, showing the process of operation of the device in contracting the rings to size and bringing the clamping pressure thereagainst.
Figure 2:
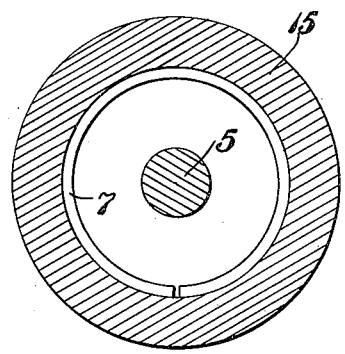
Fig. 2 is a horizontal section on the plane of line 2—2 of Fig. 1.

The rings 7 which normally open at their partings made at one side thereof when free to do so are placed, the required number of them, upon the upper side of the flange or collar 4, as shown in Figs. 1 and 3, and a pressure collar or head 8 having a central opening to pass over the section 5 of the arbor is placed around said section 5 and against the uppermost ring 7. With the present invention said pressure collar 8 is to be brought against the upper side of the uppermost ring 7 with a heavy pressure sufficient to clamp the rings together and hold them against any outward springing after the rings have been contracted to the desired outer diameter and their partings brought nearly to completely closed position. When thus contracted and heavily pressed against a cotter member 9 is inserted through the slot at 6, its edge next to the pressure head 8 being in the same plane with and bearing against the outer side of said head, while its opposite edge is inclined with the same degree of inclination as the inclined side of the slot 6, thereby holding the parts in clamped relation with the rings ready for the subsequent machine operations thereon. It is of course to be understood that the rings will be suitably finished at their contacting flat sides and are not clamped until the casting scale or skin has been properly machined therefrom at said flat sides.

To contract the rings and supply the requisite pressure for their clamping the arbor press with which the device may be used and which, as is well known in the art, has a vertically movable fixture above the press table which may be raised and lowered with the application of a very considerable force. Such upper fixture is adapted to receive the upper end of a spindle 10, the axis of which is in substantial alinement with the axis of the arbor and with the vertical opening in the post 2. Said spindle 10 at its lower portion carries a head 11 from which at its central portion a stem 12 extends downwardly, threaded at its lower end adapting it to receive a nut above which a flat washer 13 is placed. Said washer goes inside of the contracting sleeve of the fixture which, as shown has an upper end 14 and a downwardly extending cylindrical sleeve 15 open at its lower end, the upper end 14 being provided with an opening for the passage of the stem 12 after which the washer 13 and the nut are secured in place. Between the lower side of the head 11 and the upper end 14 of the contracting sleeve a plurality of balls may be located in suitable annular grooves provided in the parts for their reception. The hole through the upper end 14 of the sleeve 15 is slightly larger than the stem 12 and the grooves are slightly wider than the balls as shown in Fig. 1 whereby a limited lateral movement of the sleeve 15 relative to the head 11 is provided.

The sleeve interiorly has a cylindrical upper inner recess continued at the lower portion in a cylindrical recess of larger diameter with a continuous annular horizontal shoulder 16 at their juncture. The diameter of the upper portion of said recess is less than the exterior diameter of the head 8, while the diameter of the lower portion of it is such that the ring contracting sleeve 15 may be brought downwardly over said head 8 and over the ring castings and the collar 4. It is evident that upon the downward movement the shoulder 16 will come to said head 8 and bear against it at its upper side and adjacent its peripheral portions. The sleeve 15 has a horizontal opening 17 through one side thereof, and at its lower end is interiorly tapered downwardly and outwardly from the lower end of the lower larger portion of the interior recess of the sleeve as indicated at 18.

In operation the arbor having been put in place vertically on the post 2 and the rings 7 located upon the collar 4 the head 8 is placed over the rings. The spindle 10 and the attached parts are in an elevated position when this occurs. The spindle 10 is then moved in a downward direction as in arbor press operations. The rings 7 which are open to the full extent of the partings, upon being peripherally engaged by the inclined sides of the conical surfaces at 18 are contracted very nearly to closed position and all of them are thus contracted by the time that the shoulder 16 reaches the upper side of the head 8. Thereupon with further exertion of force tending to move the spindle 10 downwardly, the contracted rings are subjected to the heavy side pressure and clamped at their adjacent sides against each other with the lowermost ring at its lower side clamped against the adjacent upper side of the collar 4, and the upper ring at its upper side has the pressure head 8 bearing and clamped thereagainst. In such position the cotter member 9 is inserted through the opening at 17 and passed into and partially through the slot at 6 and if necessary may be struck a light blow at its outer end. The spindle 10 and the connected parts are then raised and the arbor with the contracted and clamped rings located thereon is ready for removal and transfer to a lathe or other machine upon which further machining operations at the outer curved surfaces of the rings are to be performed.

With the construction described the machine may be operated by operators with limited strength and without undue exertion on their part which, continuously repeated during their hours of work, is exhausting to even strong operators and practically impossible to those of less strength. The construction is one by means of which the rings may be loaded on the arbors with rapidity. The interior diameter of the lower part of the recess in the clamping sleeve 15 is what gauges the extent of contraction of the rings which contraction as previously mentioned should not be sufficient to completely close the ring gaps and bring the ends of the rings into any abutting pressure against each other.

The invention is defined in the appended claims and is to be considered comprehensive of all forms of structure within their scope.

I claim:

1. A split ring contracting and clamping device comprising a sleeve having an open end, means for mounting said sleeve for movement longitudinally of its axis, said sleeve being interiorly bored from its open end, first in the form of an inwardly tapered portion, next with a cylindrical portion of a diameter substantially that of a closed split ring followed by a reduced diameter cylindrical portion with a shoulder at the juncture between said cylindrical portions, means at the open end of the sleeve for holding a plurality of superimposed split rings coaxially with said sleeve, whereby axial movement of said sleeve over said rings will result in their contraction by said tapered portion and their being clamped against each other by said shoulder, said sleeve having a lateral opening at and above said shoulder to render the interior of the sleeve and the rings accessible for locking them in their contracted and clamped condition.

2. A construction containing the elements in claim 1 combined with means for providing a limited lateral movement between said sleeve and said mounting means.

3. A construction containing the elements in claim 1 in which said means for holding a plurality of rings comprises an arbor having a post, means for supporting said arbor with said post approximately coincidental with the axis of the sleeve, a collar surrounding and slidably mounted on said post and engageable by said shoulder upon downward movement of said sleeve, and laterally movable means for holding said collar against leaving said post and insertable through said lateral opening in the sleeve.

HAROLD M. SCARFF.